United States Patent

Sasaki et al.

[11] 3,920,517
[45] Nov. 18, 1975

[54] NUCLEAR REACTOR FUEL ASSEMBLY

[75] Inventors: Youichi Sasaki; Junichiro Tashima, both of Yokohama, Japan

[73] Assignee: Tokyo Shibaura Electric Co., Ltd., Kawasaki, Japan

[22] Filed: June 30, 1971

[21] Appl. No.: 158,223

[30] Foreign Application Priority Data
June 30, 1970 Japan.............................. 45-64660

[52] U.S. Cl. ............................................... 176/78
[51] Int. Cl.² ................................................ G21C 3/32
[58] Field of Search............................. 176/76, 78

[56] References Cited
UNITED STATES PATENTS

| | | | |
|---|---|---|---|
| 3,300,388 | 1/1967 | Jerman et al. ............... | 176/78 X |
| 3,481,021 | 12/1969 | Glandin ......................... | 176/78 X |
| R27,173 | 9/1971 | Lass et al. ..................... | 176/78 |

Primary Examiner—Harvey E. Behrend
Attorney, Agent, or Firm—Kemon, Palmer & Estabrook

[57] ABSTRACT

Nuclear reactor fuel assemblies arranged in the form of a lattice wherein there is attached to the interface of one of two adjacent fuel assemblies a plate spring having a concave portion curved toward said interface and to the interface of the other fuel assembly a plate spring having a convex portion curved away from said interface.

5 Claims, 4 Drawing Figures

U.S. Patent  Nov. 18, 1975  3,920,517
FIG. 1
FIG. 2
FIG. 3
FIG. 4
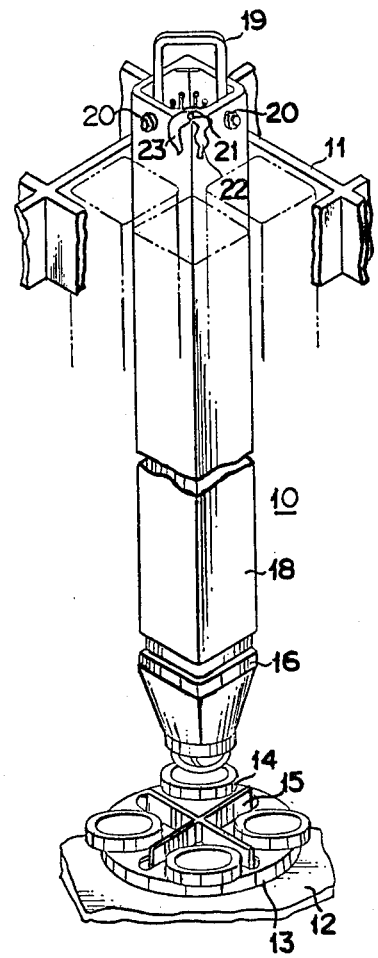
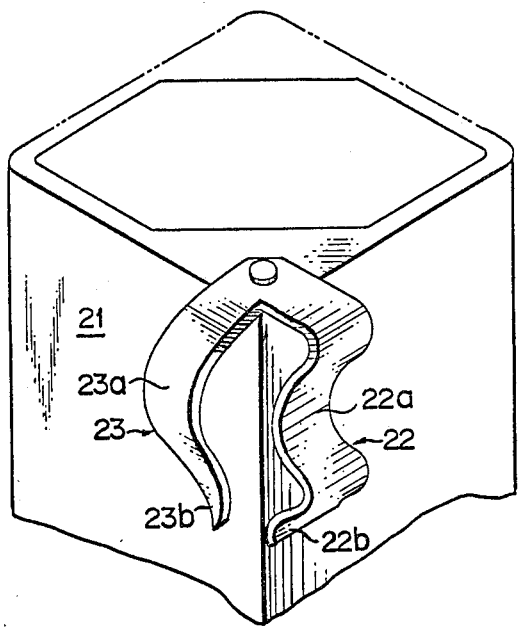
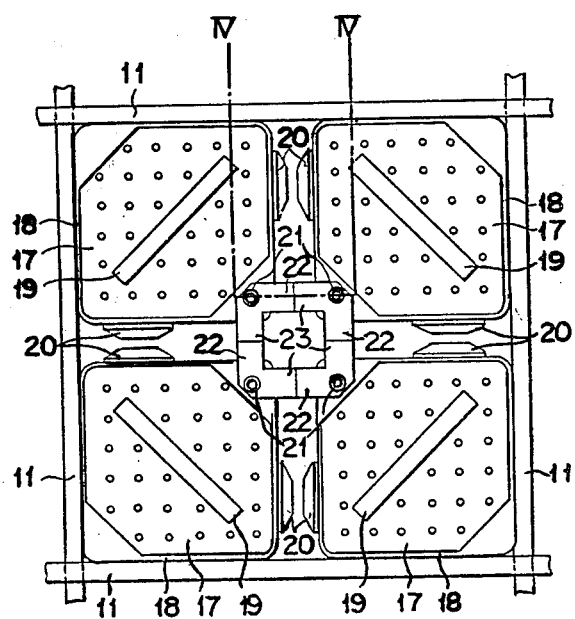
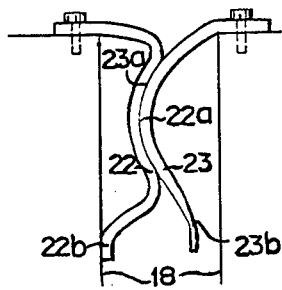

NUCLEAR REACTOR FUEL ASSEMBLY

BACKGROUND OF THE INVENTION

1. Field of the Invention

This invention relates to nuclear reactor fuel assemblies and more particularly to fuel assemblies provided with improved elastic support spacers or channel fasteners to hold the respective fuel assemblies at a substantially fixed interval.

2. Description of the Prior Art

In a boiling water reactor plant, there are collected a large number of fuel rods into a fuel bundle, which is received in a rectangular columnar casing having a substantially square cross section (generally known as a channel) to constitute a fuel assembly. The bottom projection of the fuel assembly is fitted into a cavity formed in a base support member. The upper ends of the fuel assemblies are supported by a latticed support frame member known as an upper grid. A large number of fuel assemblies thus supported are disposed in the core of a nuclear reactor. Into each square compartment defined by said latticed frame member are generally inserted four fuel assemblies to constitute one cell. An interspace between adjacent fuel assemblies constitutes a coolant passage and is also used as an area into which there is introduced a control rod. For proper operation of a nuclear reactor, therefore, said interchannel space should be substantially fixed. Since, however, the fuel channel is very likely to be deformed or vibrate due to thermal expansion, the interchannel space is generally fitted with an elastic support spacer.

SUMMARY OF THE INVENTION

The object of this invention is to provide a fuel assembly comprising an elastic support spacer so improved as to suppress the vibration, substantially eliminate the damage and prolong the life of said assembly.

The above object is attained by fitting two plate springs as the aforesaid elastic support spacers to the mutually facing side walls of adjacent channels, one of said plate springs having a concave portion curved toward the corresponding side wall and its lower end mounted on said side wall substantially in parallel relationship, and the other plate spring having a convex portion curved away from the corresponding side wall with its flat end portion disposed apart from said side wall substantially in parallel relationship, thereby causing both plate springs elastically to engage each other.

BRIEF DESCRIPTION OF THE DRAWING

The invention will be better understood and its various objects and advantages will be more fully appreciated from the following description taken in conjunction with the accompanying drawing, in which:

FIG. 1 is a perspective view, partly in section, of a channel according to an embodiment of this invention, showing the relative positions of the upper and lower grids when a plurality of said channels are loaded into a cell;

FIG. 2 is an enlarged perspective view of a channel fastener according to the embodiment of FIG. 1;

FIG. 3 is a top view of a cell where there are received four fuel assemblies; and FIG. 4 is a sectional view on line IV—IV of FIG. 3, showing the manner in which there are mutually engaged channel fasteners fitted to the mutually facing side walls of adjacent fuel assemblies.

DETAILED DESCRIPTION OF THE PREFERRED EMBODIMENT

Referring to the drawing wherein the same parts are denoted by the same numerals throughout the figures, and more particularly to FIG. 1, numeral 10 denotes a fuel assembly. Numeral 11 shows an upper support frame member known as a upper grid. The base 13 mounted on said lower grid 12 is perforated with four engagement holes 14 to receive the bottom ends of the four fuel assemblies 10. Thus the fuel assemblies are arranged with the lower ends fitted into the engagement holes 14 and the upper ends pressed against the side walls of the upper grid 11. A set of four fuel assemblies is supported between the upper and lower grids 11 and 12 to constitute a cell. The reactor core consists of an aggregate of such cells. Numeral 15 represents a control rod having a cross-like section which is fitted from below through an interspace between adjacent fuel assemblies.

The fuel assembly consists of many fuel rods held by upper and lower tie plates 16 and 17 (FIG. 3) so as to be erected straight upward. As seen from this figure, the fuel rods are set up in the form of a lattice having seven rows and seven columns, that is, in a total number of 49. Further securely to support the fuel rods, there are provided between the upper and lower tie plates a plurality of (for example, seven) spacers (not shown) substantially at an equal space in a longitudinal direction. A fuel bundle thus constructed is received for increased rigidity in a columnar channel 18 having a square cross section. Numeral 19 is a handle used in inserting and removing a fuel assembly.

At the upper part of that side wall of a channel which faces the adjacent fuel assembly there are provided a projecting stop member 20 and an elastic spacer or fastener 21 illustrated in enlargement in FIG. 2. While the four fuel assemblies are almost accurately located by having the lower ends inserted into the engagement holes 14, said assemblies are securely set in place by having the upper ends pressed against the side walls of the upper grid 11. The fastener 21 is used to provide said pressing force. The stop member 20 is intended to limit the possible displacement of a fuel assembly to a prescribed range, if said displacement is likely to be carried to excess due to application of an external force overcoming the holding force of said fastener 21.

The fastener 21 consists of a pair of plate spring sections 22 and 23 shown in FIG. 2. Said fastener 21 is made, like the channel and other associated parts, of zircaloy having a great mechanical strength and corrosion resistance at relatively high temperatures and also a small neutron absorption cross section. The fastener 21 is fitted to the upper end of the channel, with the plate spring sections or leg portions 22 and 23 thereof extending downward along the ajacent side walls of the channel 18. One leg portion 22 has a concave surface 22a curved toward the corresponding channel side wall, with its flat lower end 22b mounted on said side wall in parallel relationship. The other leg portion 23 has a convex surface 23a curved away from the corresponding channel side wall with its flat lower end disposed apart from said side wall in parallel relationship.

Referring to FIG. 3 and FIG. 4 showing a section on line IV—IV of FIG. 3, the leg portion 22 of the fastener 21 screwed to the upper end of the left channel 18 elastically engages the leg portion 23 of the fastener 21 screwed to the right side channel 18, thereby causing the left side channel wall to be urged leftward and the right side channel wall to be pressed rightward. The concave surface 22a and convex surface 23a of the mutually engaging leg portions 22 and 23 make a plane contact, stabilizing said engagement and reducing frictional wear between both surfaces 22a and 23a. If the adjacent channels should approach each other by shaking or for other reasons to cause the lower end 23b of the leg portion 23 to contact the outer wall of the right side channel 18, then the leg portion 23 will be supported at both ends to increase the spring constant with the resultant greater damping effect against vibration. Further, the parallel arrangement of the lower ends 22b and 23b of the leg portions 22 and 23 with the channel walls prevents them from being damaged.

As mentioned above, this invention provides a nuclear reactor fuel assembly comprising an elastic support spacer which can locate the fuel assembly at a desired position, suppress vibrations to which said assembly may be subjected, and permit its long life and stable operation.

What we claim is:

1. In a fuel assembly for a nuclear reactor having a reactor core comprising cells containing fuel rods supported by tie plates at both upper and lower ends arranged in groups within said cells defined as substantially square compartments by an upper support frame member, each cell comprising four columnar channels having a substantially square cross section enclosing a plurality of fuel rods, said four channels of a cell presenting mutually facing walls, the improvements which comprises an elastic member fitted at the upper end of said assembly that acts to elastically press said channels of a cell against said upper support frame member, said elastic member comprising plate springs fitted to said mutually facing walls to extend downwardly respectively from one corner of the upper ends of said side walls, said plate springs being arranged in pairs, one spring of a pair having a concave surface curved toward the corresponding side wall of the channel to which it is fitted and a flat lower end that engages said side wall substantially in parallel relationship, the other spring of the pair having a convex surface curved away from the corresponding side wall of the channel to which it is fitted and a flat lower end that is disposed apart from its corresponding side wall in parallel relationship, said elastic member enabling the channels of a cell of the reactor core to be rigidly set in place by elastic engagement between the plate springs of the elastic member.

2. A fuel assembly of claim 1 wherein said concave surface of one plate spring is in surface contact with said convex surface of the other plate spring.

3. A fuel assembly of claim 1 wherein said elastic member consists of four parts, each part consisting of a first plate spring having said concave surface and a second plate spring having said convex surface, said first and second plate springs being fitted to a corner at the top of one of said four channels of a cell of said reactor core, the plane of the concave surface of said first plate spring being substantially perpendicular to the plane of the convex surface of said second plate spring.

4. The fuel assembly of claim 3 wherein said first and second plate springs are integral, being joined to one another at their upper ends.

5. The fuel assembly of claim 4 wherein said integral plate springs are fitted to the channel by a fastener that passes through the upper end of said part.

* * * * *